United States Patent
Chen

(10) Patent No.: US 8,647,732 B2
(45) Date of Patent: Feb. 11, 2014

(54) ANTI-MOLD FILM ASSEMBLY

(76) Inventor: Jui-Yu Chen, Taichung (TW)

( * ) Notice: Subject to any disclaimer, the term of this patent is extended or adjusted under 35 U.S.C. 154(b) by 160 days.

(21) Appl. No.: 13/409,445

(22) Filed: Mar. 1, 2012

(65) Prior Publication Data

US 2013/0230678 A1    Sep. 5, 2013

(51) Int. Cl.
*B32B 9/00* (2006.01)
*B32B 33/00* (2006.01)
*B32B 3/10* (2006.01)

(52) U.S. Cl.
USPC .......... 428/40.1; 428/40.9; 428/42.1; 428/98; 428/131; 428/137; 428/138

(58) Field of Classification Search
USPC ........ 428/40.1, 40.9, 42.1, 98, 131, 134–138, 428/143, 148, 221, 304.4, 316.6, 317.1, 428/539.5
See application file for complete search history.

(56) References Cited

U.S. PATENT DOCUMENTS

2006/0246265 A1* 11/2006 Rogers et al. .............. 428/195.1

\* cited by examiner

*Primary Examiner* — Patricia Nordmeyer
(74) *Attorney, Agent, or Firm* — Birch, Stewart, Kolasch & Birch, LLP

(57) ABSTRACT

An anti-mold film assembly has an absorptive sheet, a metallic coating and two first films. The absorptive sheet absorbs vaporizable ingredients and has a first side and a second side opposite to the first side of the absorptive sheet. The metallic coating is connected with the first side of the absorptive sheet and has a surface opposite to the absorptive sheet. The first films are ventilative and are respectively connected with the second side of the absorptive sheet and the surface of the metallic coating. Because the metallic coating is capable of drawing sulfhydryl groups of enzyme proteins contained in bacteria and killing the bacteria, the antibiotic effect of the anti-mold film assembly is greatly enhanced.

12 Claims, 5 Drawing Sheets

ANTI-MOLD FILM ASSEMBLY

BACKGROUND OF THE INVENTION

1. Field of the Invention

The present invention relates to an anti-mold film assembly, and more particularly to an anti-mold film assembly having an enhanced antibiotic effect.

2. Description of Related Art

A conventional anti-mold film has been widely applied to various locations or containers to prevent mold from growing on products, such as electronics products, precision machinery, clothing, furniture, paper, lenses or leather products. The anti-mold film is thin and is usually made of an absorptive material, such as paper or non-woven fabrics.

However, an antibiotic effect of the conventional anti-mold film is still insufficient and needs improvement.

To overcome the shortcomings, the present invention tends to provide an anti-mold film assembly to mitigate the aforementioned problems.

SUMMARY OF THE INVENTION

The main objective of the invention is to provide an anti-mold film assembly having an enhanced antibiotic effect.

An anti-mold film assembly has an absorptive sheet, a metallic coating and two first films. The absorptive sheet absorbs vaporizable ingredients and has a first side and a second side opposite to the first side of the absorptive sheet. The metallic coating is connected with the first side of the absorptive sheet and has a surface opposite to the absorptive sheet. The first films are ventilative and are respectively connected with the second side of the absorptive sheet and the surface of the metallic coating. Because the metallic coating is capable of drawing sulfhydryl groups of enzyme proteins contained in bacteria and killing the bacteria, the antibiotic effect of the anti-mold film assembly is greatly enhanced.

Other objects, advantages and novel features of the invention will become more apparent from the following detailed description when taken in conjunction with the accompanying drawings.

DETAILED DESCRIPTION OF PREFERRED EMBODIMENT

With reference to FIGS. 1 to 4, a first embodiment of an anti-mold film assembly in accordance with the present invention comprises an absorptive sheet 10, a metallic coating 20 and two first films 30.

The absorptive sheet 10 has a first side and a second side opposite to the first side of the absorptive sheet 10. The absorptive sheet 10 is made of an absorptive material, such as paper, cloth, foam cotton, and non-woven fabrics. The absorptive sheet 10 absorbs vaporizable ingredients comprising 45~55% mustard oil, 20~25% garlic oil, 15~25% grape seed oil, and 10~20% chili oil. The absorptive sheet 10 may be soaked in the ingredients of liquid or gas state to absorb the ingredients. The absorptive sheet 10 may be printed with trademarks, instructions, patterns or signs.

The metallic coating 20 is connected with the first side of the absorptive sheet 10 and has a surface opposite to the absorptive sheet 10. The metallic coating 20 is made of an antibiotic metal, such as silver, copper or nanometer-silver. The metallic coating 20 is capable of drawing sulfhydryl groups of enzyme proteins contained in bacteria. Accordingly, the enzyme proteins are inactive and the bacteria can be killed. Preferably, the metallic coating 20 is made of nanometer-silver by a process of vapor or sputtering deposition. Because silver of the metallic coating 20 has a nanometer scale, an antibiotic ability of the metallic coating 20 is optimized.

The first films 30 are ventilative and are respectively connected with the second side of the absorptive sheet 10 and the surface of the metallic coating 20. Preferably, each first film 30 is made of OPP (Oriented Polypropylene). Because each first film 30 is ventilative, the ingredients of the absorptive sheet 10 can penetrate the first films 30 slowly. The first films 30 may be printed with trademarks, instructions, patterns or signs.

The anti-mold film assembly in accordance with the present invention can be placed in various locations or containers, such as a package, a box, a bag or a closet.

Figure 1:
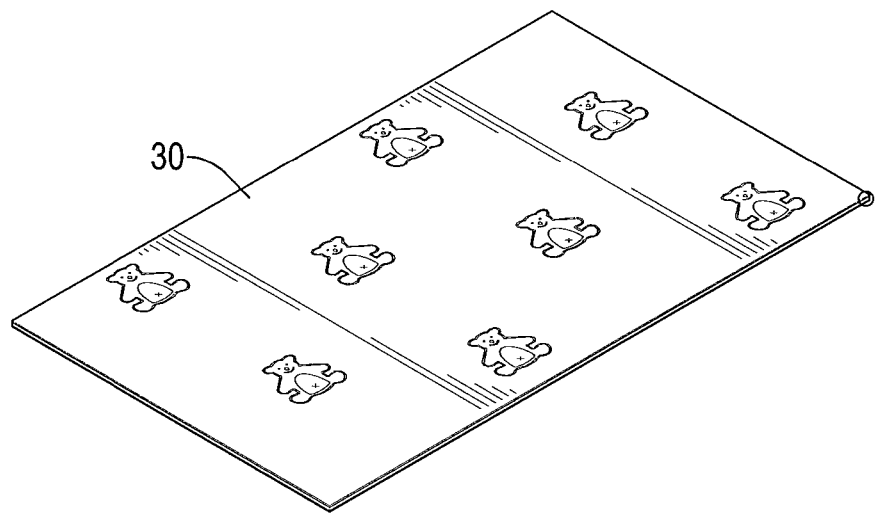
FIG. 1 is a perspective view of a first embodiment of an anti-mold film assembly in accordance with the present invention.
Figure 2:
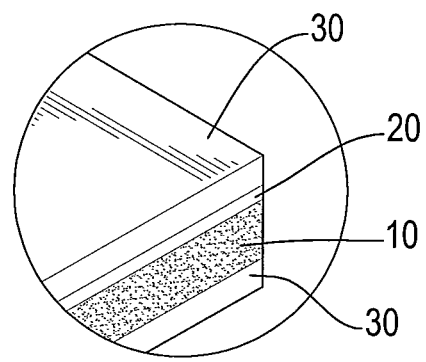
FIG. 2 is an enlarged partial perspective view of the anti-mold film assembly in FIG. 1.
Figure 3:
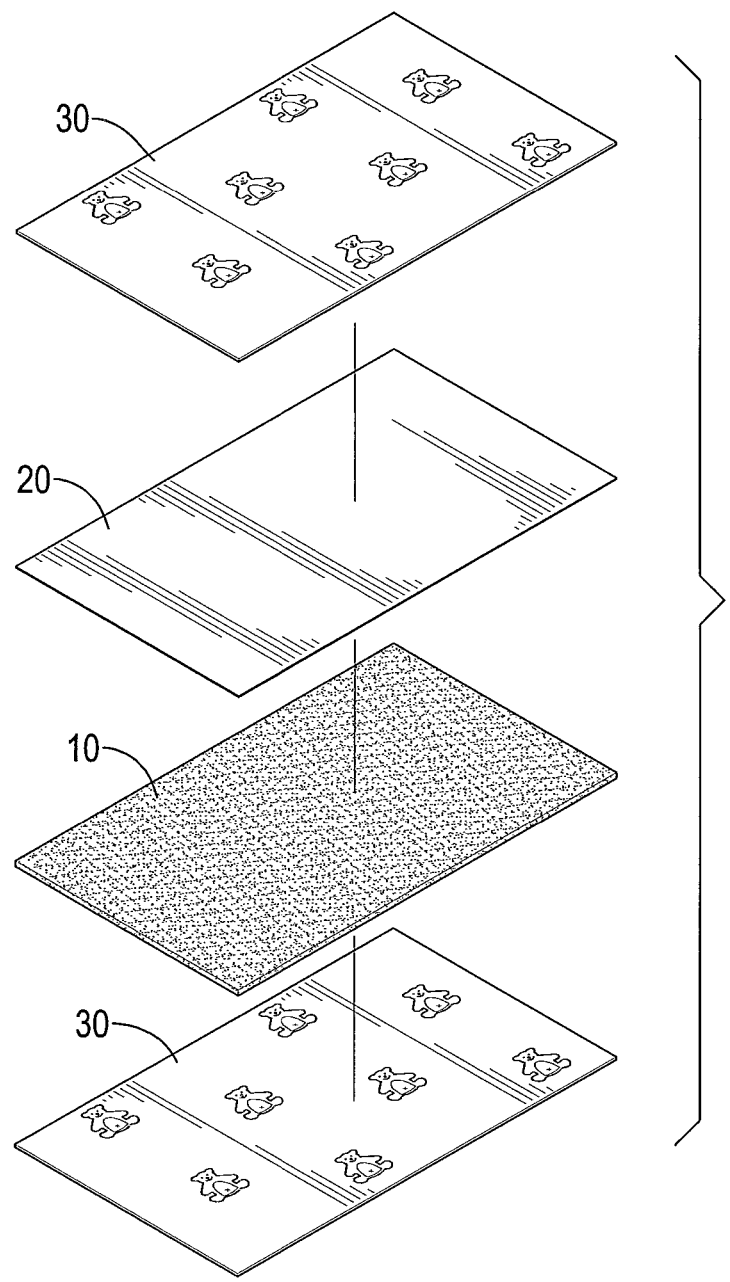
FIG. 3 is an exploded perspective view of the anti-mold film assembly in FIG. 1.
Figure 4:
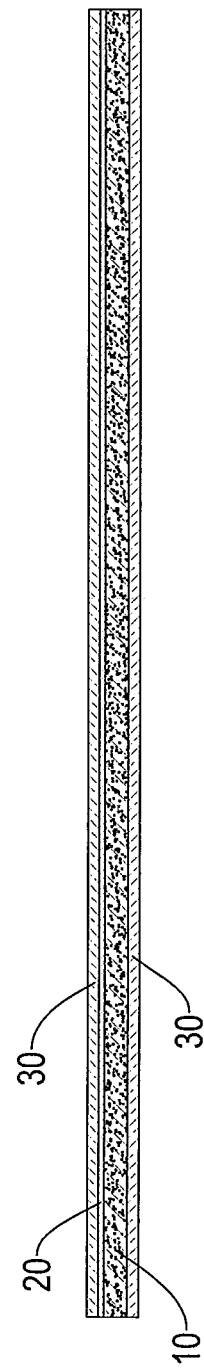
FIG. 4 is a cross sectional side view of the anti-mold film assembly in FIG. 1.
Figure 5:
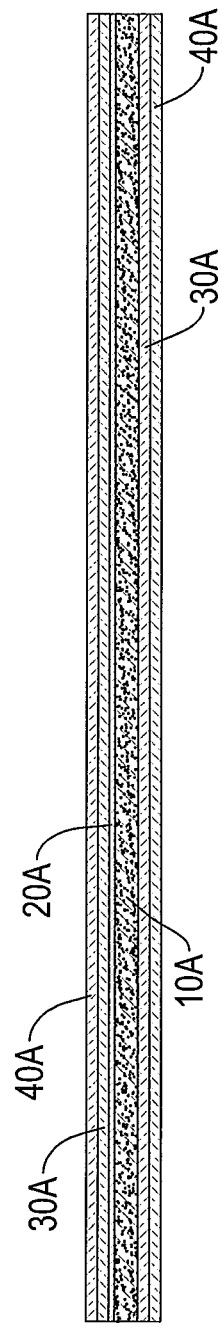
FIG. 5 is a cross sectional side view of a second embodiment of the anti-mold film assembly in accordance with the present invention.

With reference to FIG. 5, a second embodiment of the anti-mold film assembly in accordance with the present invention is substantially the same as the first embodiment. Each first film 30A has an outer surface opposite to the absorptive sheet 10A or the metallic coating 20A. The second embodiment of the anti-mold film assembly further has two second films 40A the same as the first films 30A and respectively connected with the outer surfaces of the first films 30A. Because each first film 30A and a corresponding second film 40A are formed as a two-layer structure, the first films 30A and the second films 40A can postpone the release of the ingredients of the absorptive sheet 10A. Accordingly, the lifespan of the anti-mold film assembly is prolonged.

Figure 6:
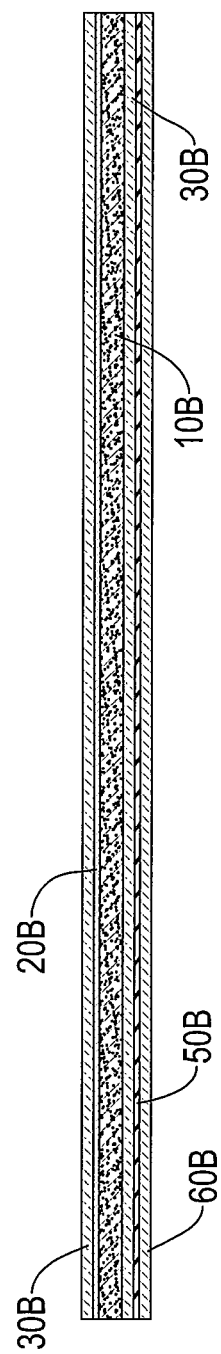
FIG. 6 is a cross sectional side view of a third embodiment of the anti-mold film assembly in accordance with the present invention.

With reference to FIG. 6, a third embodiment of the anti-mold film assembly in accordance with the present invention is substantially the same as the first embodiment. Each first film 30B has an outer surface opposite to the absorptive sheet 10B or the metallic coating 20B. The third embodiment of the anti-mold film assembly further has an adhesive layer 50B and a detachable sheet 60B. The adhesive layer 50B is connected with one of the outer surfaces of the first films 30B. The detachable sheet 60B is connected with the adhesive layer 50B. The adhesive layer 50B is located between the detachable sheet 60B and a corresponding one of the first films 30B. Accordingly, the third embodiment of the anti-mold film assembly can be adhered to various locations when the detachable sheet 60B is detached from the adhesive layer 50B.

From the above description, it is noted that the present invention has the following advantages:

1. Excellent antibiotic effect:

Because the metallic coating 20 is capable of drawing sulfhydryl groups of enzyme proteins contained in bacteria and killing the bacteria, the antibiotic effect of the anti-mold film assembly is greatly enhanced.

2. Prolonged lifespan:

The first films 30A and the second films 40A are capable of postponing the vaporization of the ingredients of the absorptive sheet 10A, so the lifespan of the anti-mold film assembly is prolonged.

3. Versatile print:

The absorptive sheet 10,10A, the first films 30,30A,30B and the second films 40A can be printed with trademarks, instructions, patterns or signs to meet different manufacturer's requirements.

4. Environment-friendly ingredients:

The ingredients are extracted from natural plants, so the ingredients can be decomposed, are environment-friendly and not harmful to humans.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An anti-mold film assembly comprising:
    an absorptive sheet the absorptive sheet containing vaporizable ingredients comprising 45~55% mustard oil, 20~25% garlic oil, 15~25% grape seed oil, and 10~20% chili oil, and having a first side and a second side opposite to the first side of the absorptive sheet;
    a metallic coating connected with the first side of the absorptive sheet and having a surface opposite to the absorptive sheet; and
    two ventilative first films respectively connected with the second side of the absorptive sheet and the surface of the metallic coating.

2. The anti-mold film assembly as claimed in claim 1, wherein
    each first film has an outer surface opposite to the absorptive sheet or the metallic coating; and
    the anti-mold film assembly further has two second films the same as the first films and respectively connected with the outer surfaces of the first films.

3. The anti-mold film assembly as claimed in claim 2, wherein the first film and the second film are made of OPP (Oriented Polypropylene).

4. The anti-mold film assembly as claimed in claim 3, wherein the metallic coating is made of silver, copper or nanometer-silver.

5. The anti-mold film assembly as claimed in claim 4, wherein each first film has a surface and a figure printed on the surface of the first film; and each second film has a surface and a figure printed on the surface of the second film.

6. The anti-mold film assembly as claimed in claim 2, wherein the metallic coating is made of silver, copper or nanometer-silver.

7. The anti-mold film assembly as claimed in claim 6, wherein each first film has a surface and a figure printed on the surface of the first film; and each second film has a surface and a figure printed on the surface of the second film.

8. The anti-mold film assembly as claimed in claim 1, wherein
    each first film has an outer surface opposite to the absorptive sheet or the metallic coating;
    the anti-mold film assembly further has
        an adhesive layer connected with one of the outer surfaces of the first films; and
        a detachable sheet connected with the adhesive layer, wherein the adhesive layer is located between the detachable sheet and a corresponding one of the first films.

9. The anti-mold film assembly as claimed in claim 8, wherein the metallic coating is made of silver, copper or nanometer-silver.

10. The anti-mold film assembly as claimed in claim 9, wherein each first film has a surface and a figure printed on the surface of the first film.

11. The anti-mold film assembly as claimed in claim 1, wherein the metallic coating is made of silver, copper or nanometer-silver.

12. The anti-mold film assembly as claimed in claim 11, wherein each first film has a surface and a figure printed on the surface of the first film.

* * * * *